United States Patent [19]

Taylor

[11] Patent Number: 4,744,333
[45] Date of Patent: * May 17, 1988

[54] PROTECTIVE FOOTWEAR FOR ANIMALS

[76] Inventor: Jackson H. Taylor, 467 Hill St., Green Lake, Wis. 54941

[*] Notice: The portion of the term of this patent subsequent to Jan. 6, 2004 has been disclaimed.

[21] Appl. No.: 895,469

[22] Filed: Aug. 11, 1986

Related U.S. Application Data

[63] Continuation-in-part of Ser. No. 626,933, Jul. 2, 1984, Pat. No. 4,633,817.

[51] Int. Cl.⁴ .............................................. A01K 13/00
[52] U.S. Cl. ........................................ 119/96; 119/1; 54/79; 36/9 R
[58] Field of Search ...................... 119/96, 1; 54/79; 36/111, 10, 7.1 R, 9 R

[56] References Cited

U.S. PATENT DOCUMENTS

| | | | |
|---|---|---|---|
| 353,428 | 11/1886 | Purson | 119/1 X |
| 2,064,566 | 12/1936 | Richman | 54/82 X |
| 2,253,837 | 8/1941 | Augspurger | 54/82 X |
| 2,424,172 | 7/1947 | Huddleston | 119/1 X |
| 2,443,831 | 6/1948 | Miller | 54/79 |
| 2,535,394 | 12/1950 | Davis | 119/7 X |
| 2,651,853 | 9/1953 | Lewis | 54/82 |
| 2,826,172 | 3/1958 | Buckle et al. | 119/96 |
| 3,067,532 | 12/1962 | Peterson | 36/9 R |
| 3,747,565 | 7/1973 | Kellam | 119/1 |
| 4,597,359 | 7/1986 | Moorman | 119/96 X |
| 4,633,817 | 1/1987 | Taylor | 119/96 |

Primary Examiner—Carl D. Friedman
Assistant Examiner—Creighton Smith

[57] ABSTRACT

Protective footwear for animals includes a suspender system for retaining single piece or multiple-piece bootees on the animal's feet. A two-piece bootee comprises a sock of warm and comfortable yarn which is inserted into and joined to a boot of deerskin. A buckle may be secured to each bootee for receiving a strap of the suspender system. The suspender system may be fabricated as a pair of elastic ribbons draped over the animal's shoulders and hindquarters and joined by an adjustable strap running along the animal's back.

9 Claims, 5 Drawing Sheets

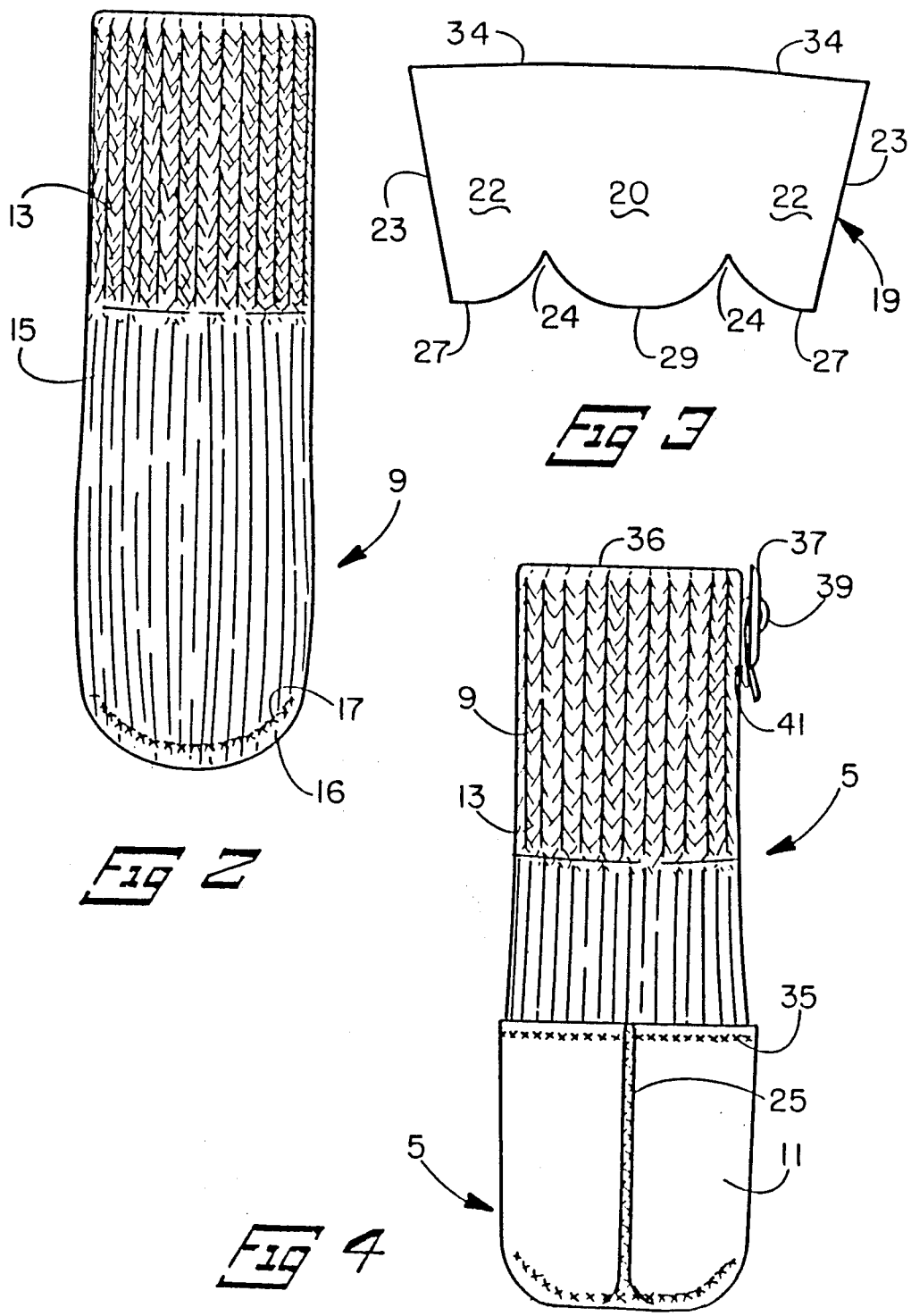

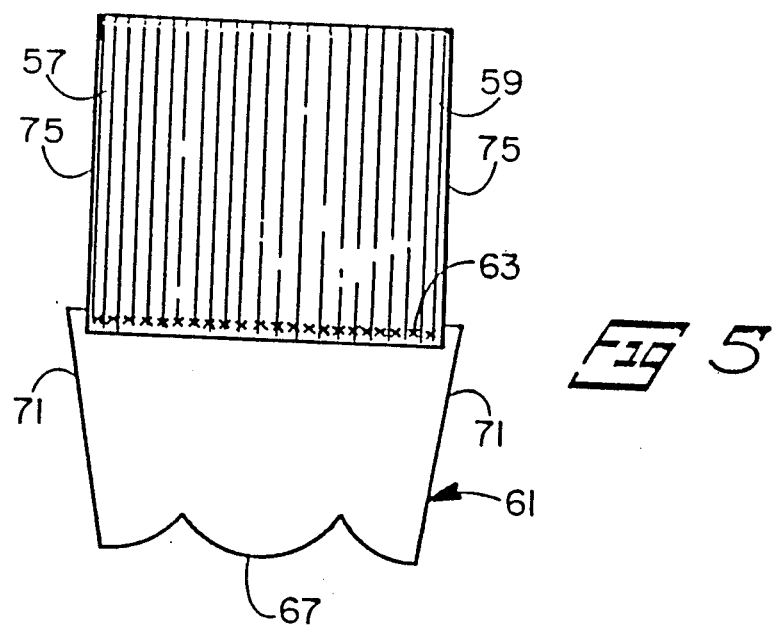
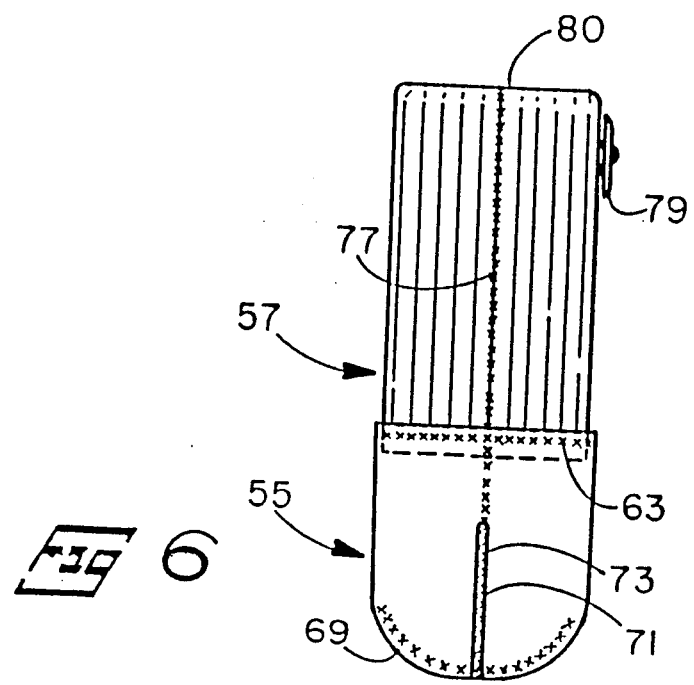

PROTECTIVE FOOTWEAR FOR ANIMALS

This application is a continuation-in-part of my co-pending U.S. patent application Ser. No. 626,933 filed on July 2, 1984, now U.S. Pat. No. 4,633,817.

BACKGROUND OF THE INVENTION

1. Field of the Invention. This invention pertains to animal footwear, and more particularly to protective footwear for animals having support means for holding the footwear in place.

2. Description of the Prior Art

Various devices have been developed to protect the feet and legs of work and pet animals from the elements, and also for use as therapeutic and restraining devices. For example, U.S. Pat. Nos. 601,974 and 2,253,837 disclose boots for therapeutic use, each designed to hold liquids and medicines and which are held in place by either straps or a harness arrangement respectively, but preferably with no movement of the animal and are clearly designed for use primarily with horses. U.S. Pat. No. 3,747,565 discloses a boot intended as a restraining device for use while grooming the animal and to protect the groomer from being injured by the animal's claws and is clearly designed for use by animals such as cats. The boot is held in place by a net-like sleeve terminating in tie strings which tie over the animal's back. It is clear that the boots and sleeves are not intended for walking or other normal animal functions.

It is well known that the feet and legs of dogs are especially vulnerable to snow, ice, the salt and chemicals used to melt such ice, rough ground, and hot pavement. U.S. Pat. Nos. 2,064,566, 2,424,172, 2,446,371, 2,535,394, 2,651,853, and 3,209,726 all disclose variations of form fitting, molded, and other boots most of which are meant to fit snugly in an attempt to prevent slipping off and many having local means of securing such as surrounding straps, laces, adhesive tape, zippers, etc., and all of which might possibly cut circulation and/or cause discomfort due to their binding effect on the feet and legs. None of the previously mentioned, however, present a satisfactory method of retaining the boot on the dog's foot, part of the problem being that, unlike a human's foot, a dog's foot does not form a definite right angle to its leg, and has no heel, both of which are extremely critical to successfully retain a boot with only local means of securing. Many of the aforementioned boots offer openings for ventilation or for allowing the dogs' toes to protrude which defeat the purpose of protection from the elements.

U.S. Pat. No. 3,762,073 displays a disposable dog legging made from heat sealable thermoplastic material which again might possibly cause binding because of its securing straps and fail to insulate from the cold as cold plastic adds to the discomfort and becomes very stiff and unpliable when cold which can even cause cracking or tearing.

Thus, a need exists for animal footwear which is durable and comfortable, and which remains in place for extended periods of vigorous activity.

SUMMARY OF THE INVENTION

In accordance with the present invention, warm and comfortable protective animal footwear is provided which is capable of being worn for extended periods without coming off the animal's feet and which requires no binding in fit, binding fasteners, and is totally enclosed to keep out the irritating elements. This is accomplished by apparatus which includes durable bootees in combination with supporting suspenders.

The bootees may be manufactured or molded from a single piece of flexible material. Alternately, the bootees may be of multiple piece construction. In a two piece construction, the first piece is a sock of flexible material and of sufficient size and length to fit over the paw of the animal, such as a dog, and to extend above its knees. The second piece is a relatively short boot of flexible but durable material which encases and is joined to the lower portion of the sock so as to substantially surround the dog's paw. The sock is preferably made of a warm and knittable yarn. The boot is preferably made of deerskin, and the boot may be joined to the sock by sewing, or bonding.

The upper end of the bootee is provided with a buckle or similar adjustable fastening device, as for example, a Velcro fastener, or receives a similar device. To hold the bootees in place on the animal's foot, the present invention includes a suspender system. In the preferred embodiment, the suspender system comprises a first strap which drapes over the animal's back at the shoulder, the ends of which are received in the buckles of the socks on the dog's front feet. A second strap is similar to the first, but it drapes over the dog's hindquarters to fasten to the buckles of the socks on the rear feet. A third set of straps entwined in a buckle to become one of adjustable length extends longitudinally along the dog's back and joins the two draped straps. The suspender straps are preferably made of an elastic material.

To suit breeds of dogs having very sloping hindquarters, the suspender system includes an optional securing strap for attaching to the dog's collar to prevent the possibility of the suspender system slipping off the dog's hindquarters.

The protective footwear of the present invention may be modified to suit different size dogs. For example, manufacturing considerations of the two piece bootee may preclude sewing a full sock to the boot in sizes suitable for very small dogs. In that situation, the sock does not extend to cover the dog's paw, but rather it terminates at the junction with the boot, to which it is sewn in a fashion generally similar to the larger size bootee.

Other aims and advantages of the invention will become apparent from the disclosure.

BRIEF DESCRIPTION OF THE DRAWINGS

FIG. 2 is a front view of the sock which forms a portion of the present invention;

FIG. 3 is a view of a blank of material in the unrolled position for fabricating the boot of the present invention;

FIG. 4 is a front view of the bootee of the present invention;

FIG. 5 is a view of a blank of material in the unrolled position from which a modified bootee of the present invention is made;

FIG. 6 is a front view of a modified bootee fabricated from the blank of FIG. 5;

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
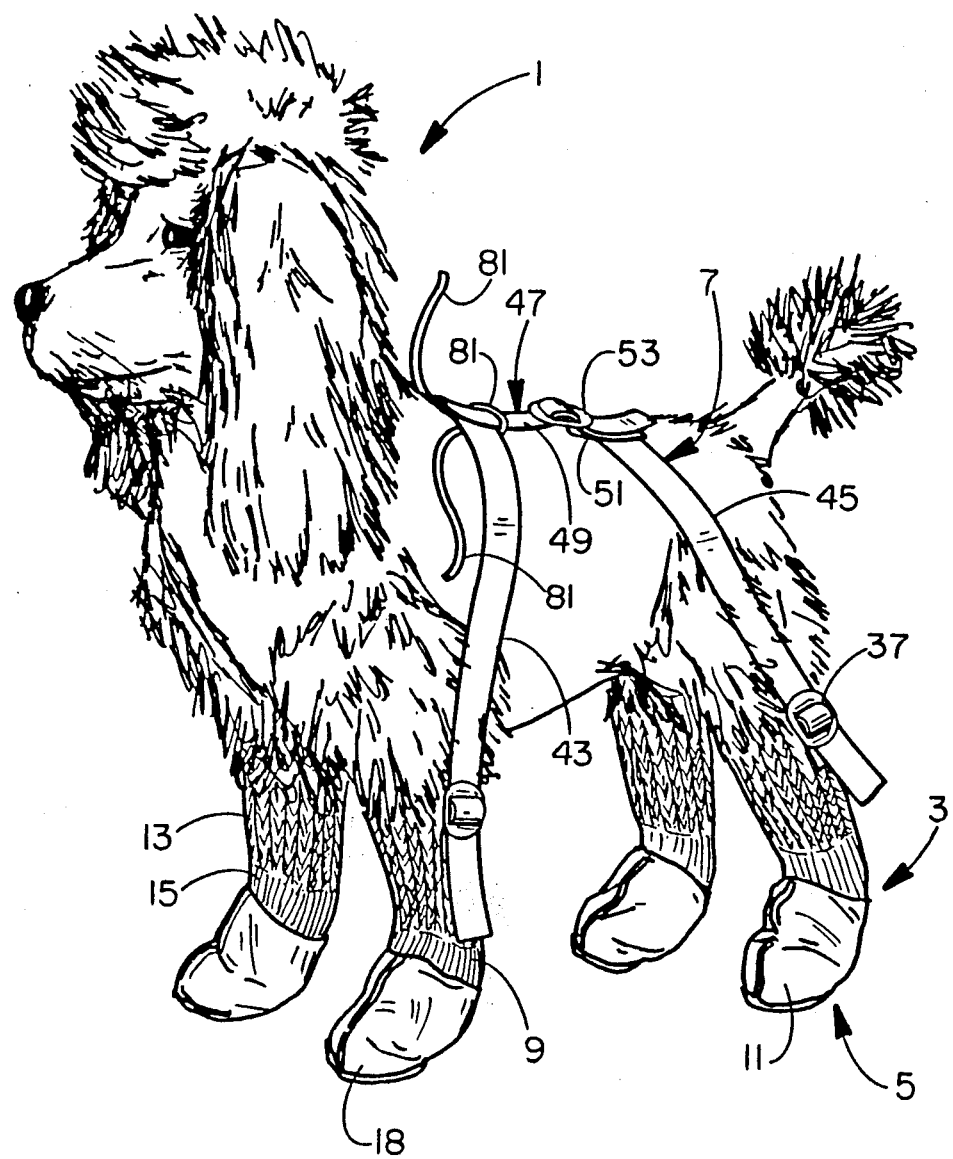
FIG. 1 is a perspective view of a dog wearing the protective footwear with suspender system of the present invention.

Referring to FIG. 1, an animal 1 is illustrated which is wearing a two piece bootee version of protective footwear 3 of the present invention. This version of protective footwear featuring the two piece bootee finds particular usefulness for protecting and insulating the feet and legs of pet dogs from snow, ice, the salt and chemicals used to melt such ice, rough terrain, and hot pavement, or sand, and for keeping the dog's feet and legs clean to protect against soiling carpets, etc. However, it will be understood that the invention is not limited to outdoor applications.

The protective footwear 3 includes a plurality of bootees 5 joined to a suspender system 7. The bootees are substantially identical, so that the description of one is believed to be sufficient. Each two-piece bootee 5 is composed of a flexible sock 9 and a flexible boot 11. The sock 9 is preferably of an extra close knit construction and made from high bulk yarn. The sock has no heel, but rather it is of the tube type. The upper portion 13 is ribbed vertically, and the yarn thereat includes rubberized elastic for gently embracing the dog's leg. The lower portion 15 of the sock is of standard knit construction and terminates in a "fish-mouth" toe 16 formed by stitchings 17, FIG. 2 The length of the sock is such as to extend well above the dog's knee and preferably to the "legpit." That length is important to minimize flexing of the suspender system as the dog is walking, as will be explained hereinafter. The sock yarn may be of any suitable material, but an Orlon/Nylon combination is a preferred material, because it is warm, resilient, dyes easily, and retains dye when wet.

Illustrated in FIG. 3 is a blank 19 from which the boot 11, FIG. 1, is made. The blank 19 has a central panel 20 and a pair of symmetrical side panels 22. In the preferred embodiment, the side edges 23 of the side panels 22 converge downwardly. To provide a rounded contour and a pleasing appearance to the toe end 18 of the finished boot, FIG. 4, the blank may be scalloped at 24 along the lower margins 27 and 29 of the side and end panels, respectively. The top margins 34 of the side panels may slope downwardly toward the side edges 23. The blank is rolled so that the two side edges 23 abut, and the edges 23 are sewn together along external stitch line 25 to create a frusto-conical band of material. The lower margins 27 of the side panels are then sewn to central margin 29 along stitch lines 31 to create the open top downwardly converging boot 11. The frusto-conical shape of the boot reduces the amount of material at the front corners of the boot, FIG. 1, thereby preventing them from turning under while the dog is walking which could cause him to stumble. The tapered margins 34 further reduce the bulk of folded boot material on the top side of the boot and dog's foot thereby enhancing comfort.

The boot material is preferably deerskin. That material is very soft, flexible, and comfortable to the dog's foot. Deerskin may be washed, and when dried it does not become stiff or brittle. To provide increased traction on icy surfaces, a sueded side of the deerskin is placed to the outside.

After the blank 19, FIG. 3, has been converted into the open top boot 11, the sock 9, FIG. 2, is inserted into the boot until the toe 16 contacts the stitch line 31. Then the boot and sock are joined, as by sewing, along stitch line 35, FIG. 4, to form a unitary bootee 5 having a warm and comfortable liner provided by the sock and a tough but flexible and comfortable outer boot 11.

Near the top edge 36 of the sock 9 is fastened an adjustable fastener. In the illustrated construction, the fastener is a buckle 37. To prevent contacting and irritating the dog's skin, the greater portion of the buckle 37 is located below the top edge 36. The buckle is preferably fastened by means of a short loop 39 of elastic material wrapped around the center bar of the buckle and sewn to the sock at stitch line 41. The buckle need not have a tung, but it should have teeth on each outside bar to retain position of the elastic suspenders. Bootees 5 are either right or left hand, and that is determined by the side of the bootee on which the buckle is sewn.

To hold the bootees 5 in place on the dog's feet and legs, the protective footwear 3 of the present invention includes the suspender system 7, FIG. 1. Due to this feature the boots can be made to fit more loosely and therefore more comfortably than previous footwear and allow natural expanding of the feet and toes while walking. Also, due to this feature, they require no binding straps, tape, or other fasteners to cut circulation or otherwise cause discomfort. In the illustrated instruction, the suspender system 7 is composed of a pair of substantially identical front and back straps 43 and 45, respectively. The straps 43 and 45 are adapted to drape over the dog's shoulders and hindquarters, respectively. The free end of each strap is inserted into the corresponding bootee fastener, such as buckle 37, thereby permitting the custom fitting of the suspender system to the dog. It will be understood, of course, that the fasteners may be joined to the suspender system straps rather than to the bootee. If the fastener is a buckle, a short strap, not illustrated in FIGS. 1-7, may be fastened to the bootee for engaging the corresponding suspender strap. Some fasteners, such as mitten clips, require no strap to be attached to the bootee. The relatively long lengths of the socks 9 permit fastening the straps 43 and 45 only slightly below the respective shoulders. Consequently, the amount of strap flexing due to walking is minimized, and the straps keep the bootees securely in place. The straps 43 and 45 are joined by an adjustable strap 47 which, when the suspender system is in place on the dog, extends longitudinally along the dog's back. The strap 47 may consist of a short strap 49 fastened to the front strap 43, as by sewing, and a second shorter strap 51 fastened at one end to the back strap 45 and terminating in a loop enclosing the center bar of buckle 53. Inserting the free end of the first strap 49 into the buckle 53 permits adjustment of the strap 47 to suit the spread between the dog's front and hind legs and the shorter rear section positions the buckle over the most comfortable position of the dog's back.

Some breeds of dogs, as for example Whippets and, to a lesser extent, miniature Schnauzers, have sloping hindquarters. To prevent the suspender system 7 from sliding backward on the hindquarters, the suspender system 7 may include an optional securing strap 81, FIG. 1. The strap 81 may be fastened to the strap 47 and looped under front strap 43 for securing to a conventional dog collar, not shown.

Figure 7:
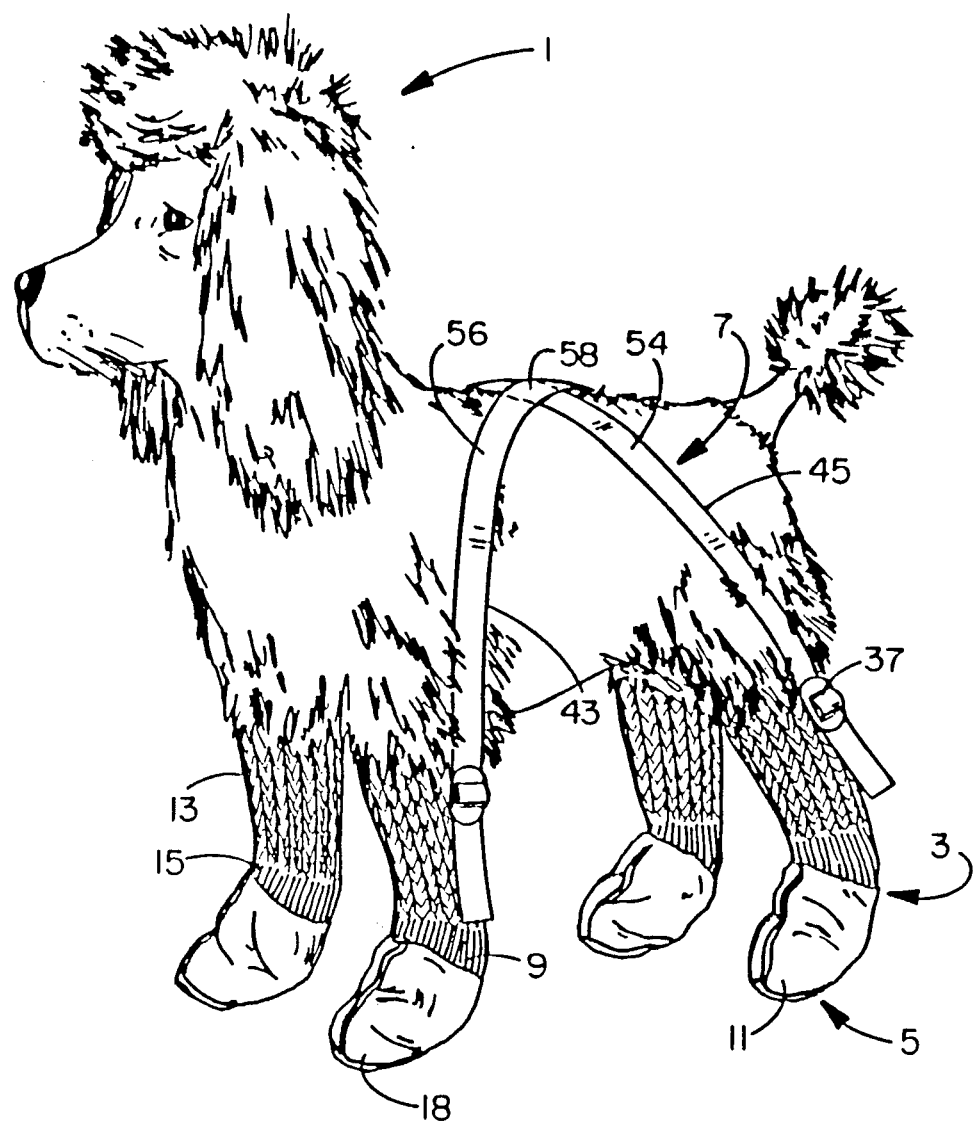
FIG. 7 is a perspective view of a dog wearing a modified version of the protective footwear of the present invention.

In a modified version of the suspender system 7, only two straps are used. Referring to FIG. 7, a pair of substantially identical straps 54 and 56 cross in an x configuration and are preferably fastened at the point 58 at which one strap overlaps the other. Each of the four strap ends is received by a buckle 37 of the corresponding bootee 5.

The preferred material for the suspender system straps is a soft and readily expandable elastic, such as pajama elastic. That material does not irritate the dog's skin nor apply excessive pressure on its toes and claws. Elastic belting of various widths depending on the size dog the particular model is intended for has been found to be satisfactory. To enhance the attractiveness of the protective footwear of the present invention, the various components may be color coordinated.

The present invention contemplates utilizing a conventional body encircling, leash type harness as a portion of the suspender system 7 for retaining the bootees 5 on the dog's front legs. In that case, an elastic strap generally corresponding to strap 43 may be joined to each side of the harness by any suitable means, and the free ends of the straps are adjustable and fastened to the corresponding bootees.

The present invention contemplates the employment of a harness for encircling the dog's hindquarters, such as is disclosed in U.S. Pat. No. 2,190,115, as a portion of the suspender system 7 for retaining the bootees 5 on the hind feet. In that situation, an elastic strap generally corresponding to strap 45 is suitably fastened on each side of the harness, and the free end thereof is adjustably received in the buckle 37 of the corresponding sock.

The present invention further contemplates utilizing the straps or other portions of a protective cover, such as is disclosed in U.S. Pat. No. 2,539,606, as a portion of the suspender system 7. In that case, elastic straps generally corresponding to both or either straps 43 and 45 are suitably joined to the protective cover, and the other ends of the straps are adjustable and fastened to the bootees on either or both the front and hind feet. The straps may be independent pieces that are attached to both the bootee and the cover by a mitten clip or similar fastener.

As described, the bootee 5 is suitable for dogs with legs from about six inches to nine inches in length. Toy-sized dogs, that is, small dogs having legs shorter than about six inches, require bootees 55 of slightly different construction, FIG. 6. Because of manufacturing considerations, it is not feasible to make bootees suitable for very small dogs with the full length sock 9 as shown in FIG. 3. Rather, referring to FIGS. 5 and 6, the sock 57 is of a relatively short length and has an open bottom. The sock 57 is not continuously knit into a tube, but it is fabricated from a flat piece of material 59 sewn to the top margin of boot blank 61 along stitch line 63. The boot blank 61 has generally tapered side edges 71 and a scalloped lower margin 67. The sock and boot blank are rolled together, and the upper potion of the edges 71 and the edges 75 of the sock blank 59 are sewn together by stitchings 77 in what will become an interior seam after turning. The unit is then turned from its inside out position and the edges 71 of the boot blank are sewn together in an exterior seam in the lower portion of the blank by stitchings 73. The lobes of the scalloped lower margin 67 of the rolled blank 61 are joined, as by sewing, along stitch lines 69. The small bootee 55 thus formed is warm and flexible, although it lacks the cloth lining provided by the sock 9 of bootee 5. A buckle 79 is fastened to the upper portion of the sock 57 by loops of thread tightly securing the center bar directly to the sock 57 and with the top most edge of the buckle 79 well below the top edge 80 of the sock 57 to prevent contact with the dog's leg.

Figure 8:
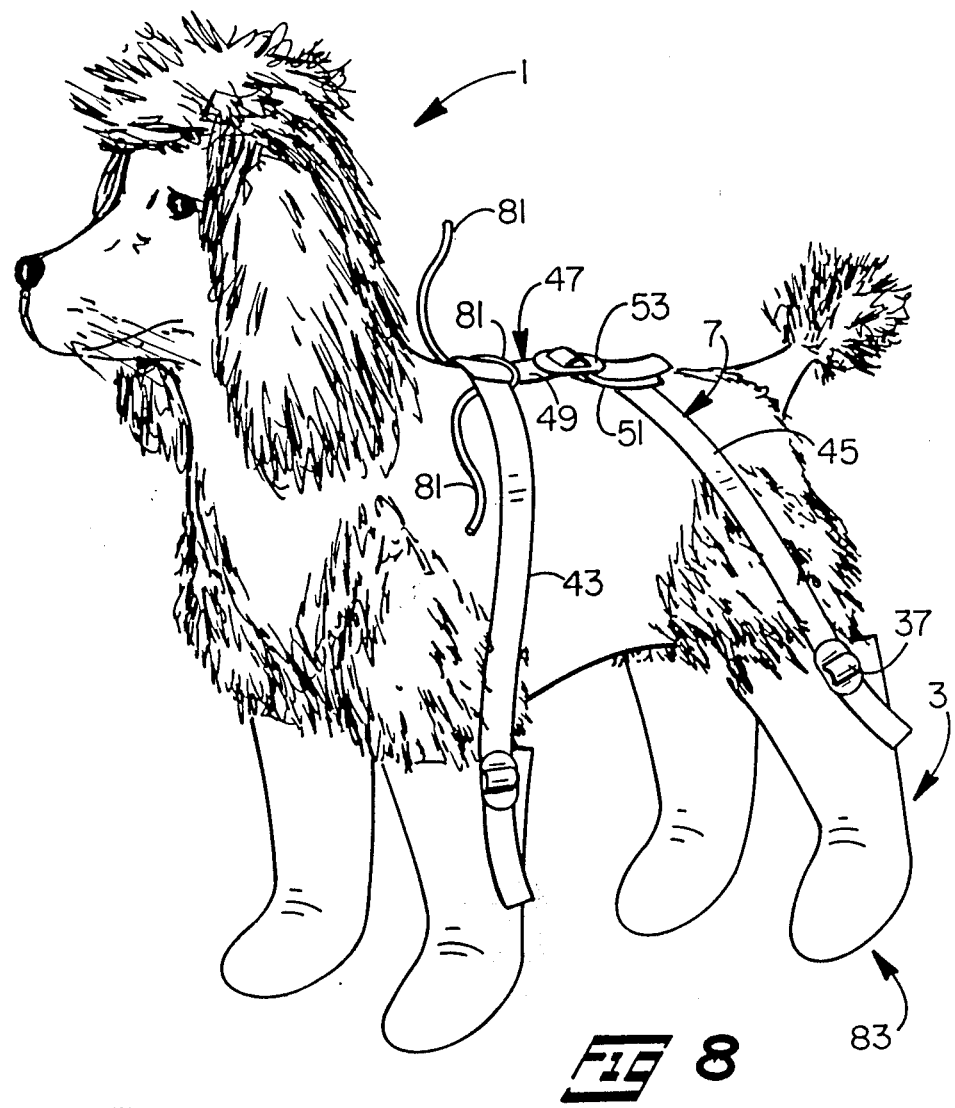
FIG. 8 is a perspective view of a dog wearing the protective footwear of the present invention in the form of single piece bootees.
Figure 9:
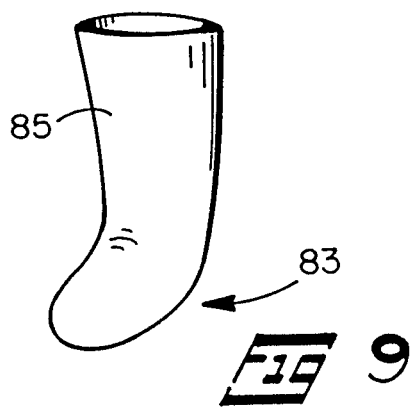
FIG. 9 is a perspective view of a single piece bootee according to the present invention

Referring to FIGS. 8 and 9, the animal 1 is shown wearing single piece bootees 83. The bootees 83 have a general shape similar to that of the two-piece bootees 5 and 55, but where bootees 5 and 55 are primarily for use as protection against cold and other winter elements, though not necessarily limited to such, bootees 83 are primarily for use as protection against rain, dampness, soiled feet, and other non-winter elements, though not necessarily limited to such. As is illustrated in FIGS. 8 and 9, the bootee 83 has no openings in the toe area, thus preventing entry of these undesirable elements. Each single piece bootee may be manufactured from a soft flexible material such as deerskin, or other material which is preferably waterproof. In that case, the material would be seamed either by sewing or bonding, illustration of which is not shown. Alternately, the single piece bootee may be molded from a soft flexible rubber or plastic material and then have the general seamless appearance of FIG. 9. To provide proper fit and attendant comfort, the upper portion 85 may be flared outwardly. The bootee 83 in FIG. 9 is shown with no fastener. That construction is used when the fastener is of the self attaching type, such as a mitten clip, and itself is attached to the strap end of the suspender system.

The protective footwear 3 of the present invention is thoroughly acceptable to dogs. Even upon their first wearing, dogs ignore it and make no attempt to chew or remove it. Further, the protective footwear does not hinder an animal's movements in any way; pets are free to function normally in all respects while wearing it. The bootees are readily removable from the suspender system for washing but are easily slipped on and removed from the dog as a single unit without disassembling.

Thus, it is apparent that there has been provided, in accordance with the invention, protective footwear for animals which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Protective footwear for dogs, comprising:
    (a) a plurality of bootees, each being an independent garment, adapted to fit over a foot and leg of a dog, each bootee having a sole of soft flexible material, each bootee having an imperforate toe section, each bootee extending up the leg of the dog and terminating at a point above the knee, but below the legpit;
    (b) a suspender system composed of an expandable material such as elastic adapted to drape over the dog's back and having a strap end corresponding to each bootee; and (c) fastening means for attaching each bootee to the corresponding strap end of the suspender system, so that the protective footwear permits full functional freedom to an active dog.

2. The protective footwear of claim 1, wherein the suspender system comprises two straps, each strap having two ends, the straps crossing on the animal's back in an "x" configuration.

3. The protective footwear of claim 1, wherein the suspender system comprises:
   a. a first strap having two ends and adapted to be draped over the animal's shoulders, the strap extending from the shoulders down the front legs and being fastened to the corresponding bootees on the front feet and legs;
   b. a second strap having two ends, and adapted to be draped over the animal's hindquarters, the strap extending from the hindquarters down the hind legs and being fastened to the corresponding bootees on the hind feet and legs; and
   c. a longitudinal strap joined to the first and second straps and extending longitudinally along the back of the animal.

4. The protective footwear of claim 1 wherein each bootee is manufactured as a single piece of material.

5. The protective footwear of claim 1 further comprising
   a strap having opposite ends, one end being fastened to the suspender system and the free end being for fastening to a standard dog collar for holding the suspender system from sliding rearward on the animal.

6. A protective bootee for the foot and leg of an animal, said foot of the animal having top, side and bottom surfaces and said leg of the animal having a knee and legpit, said bootee exending up the animal's leg and terminating at a point above the knee but below the legpit, said bootee being fabricated from a sock that is permanently joined to a boot made of a more durable material, such as leather, said boot enclosing all surfaces of the foot, whereby said boot protects the entire surface area of the foot from entry of undesirable elements through said bootee at said foot surfaces by extending said boot over the entire surface area of the animal's foot.

7. The protective bootee of claim 6 wherein the sock is manufactured as a knit, tube-type sock which completely lines the interior of the boot.

8. The protective bootee of claim 6 in combination with a suspender system adapted to drape over the animal's back and having a strap end corresponding to the bootee, and fastening means for attaching the bootee to the corresponding strap end of the suspender system.

9. Protective footwear for animals comprising:
   (a) a plurality of bootees, each being an independent garment, each having a sole of soft flexible material, each having an imperforate toe section, each adapted to fit over a foot and leg of a dog, each bootee extending up the leg of the dog and terminating at a point above the knee but below the legpit;
   (b) a suspender system to be used with a standard protective cover such as a coat or sweater for wearing by the dog, the suspender system comprising a plurality of individual straps composed of an expandable material such as elastic and having a strap corresponding to each leg of the dog, each said strap having two ends, one end for attaching to the corresponding one of said bootees, the opposite end for attaching to said protective cover; and
   (c) fastening means for fastening one end of each said strap to a corresponding one of said bootees, said fastening means being fastened to the upper half of said one bootee, and fastening means for attaching the second end of said strap to the animal cover.

* * * * *